United States Patent [19]
Wolff

[11] Patent Number: 5,553,039
[45] Date of Patent: Sep. 3, 1996

[54] MULTIPLE-DISC PLAYER CONTROL AND DISPLAY DEVICE USING EMPTY DISC CASES

[76] Inventor: Adam Wolff, 82 Spring St., Metuchen, N.J. 08840

[21] Appl. No.: 294,341

[22] Filed: Aug. 23, 1994

[51] Int. Cl.⁶ .......................... G11B 31/00; G11B 33/04
[52] U.S. Cl. .................. 369/20; 369/69; 369/292; 312/9.9; 206/308.1
[58] Field of Search .................. 369/77.1, 77.2, 369/19, 20, 292, 69; 206/308.1, 308.3, 387.14, 387.15; 312/9.1–9.64; 349/34, 36, 178, 191, 192; 340/91, 92, 98.04, 98.05

[56] References Cited

U.S. PATENT DOCUMENTS

| | | | |
|---|---|---|---|
| 5,154,291 | 10/1992 | Sur | 312/9.9 |
| 5,171,075 | 12/1992 | Nagano et al. | 312/9.48 |
| 5,191,977 | 3/1993 | Markovitz | 312/9.48 |
| 5,320,244 | 6/1994 | Yu | 312/9.21 |
| 5,440,637 | 8/1995 | Van Fleet | 369/20 |

*Primary Examiner*—Stuart S. Levy
*Assistant Examiner*—Paul J. Ditmyer
*Attorney, Agent, or Firm*—Edward M. Fink

[57] ABSTRACT

The unit works in conjunction with a multiple-disc player by storing the empty disc-cases, indicating disc status, and providing a system of selection for the discs inside of the multi-player. The unit stores empty disc-cases in relative positions to discs stored inside the multi-player. The exposed faces of stored disc-cases behave as buttons and labels.

12 Claims, 6 Drawing Sheets

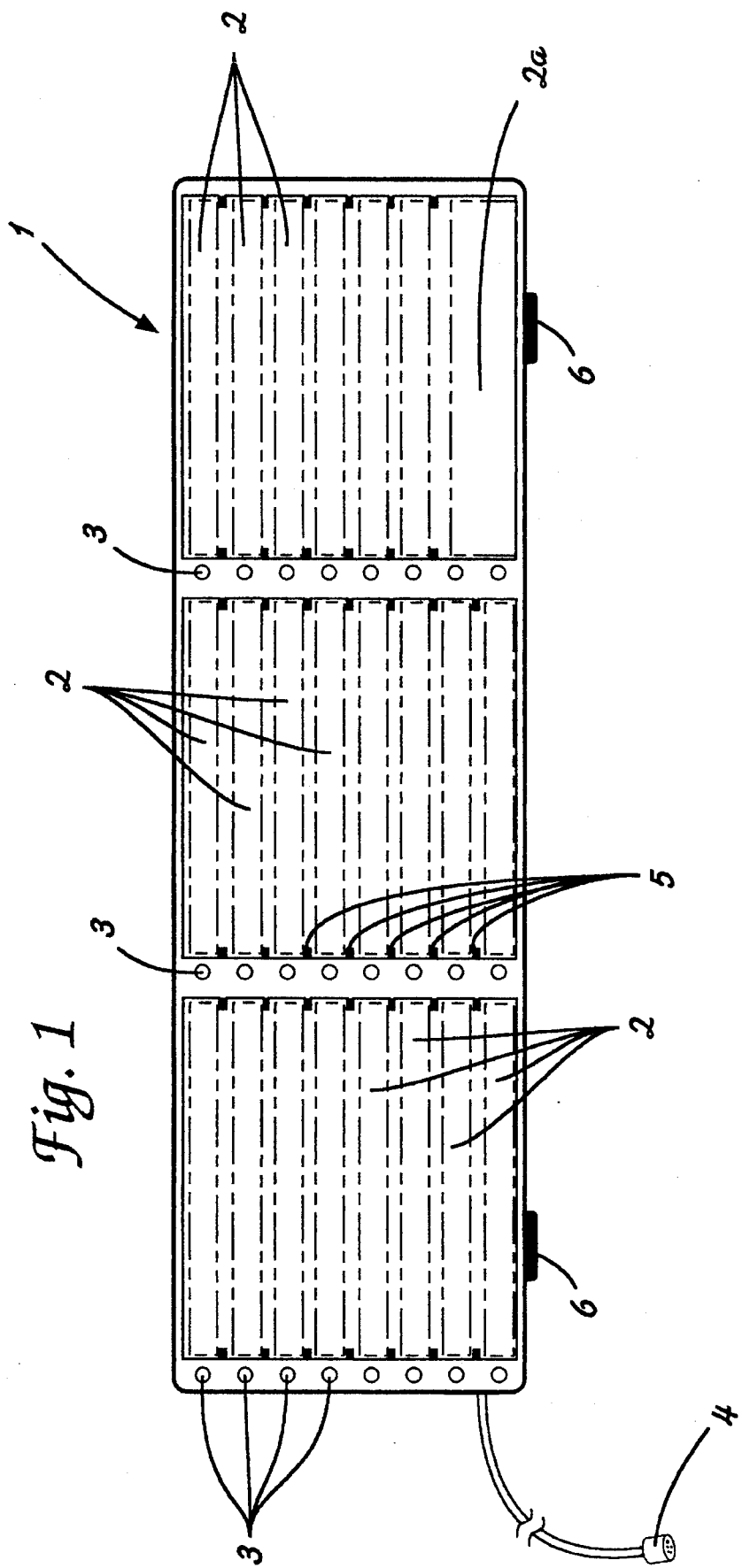

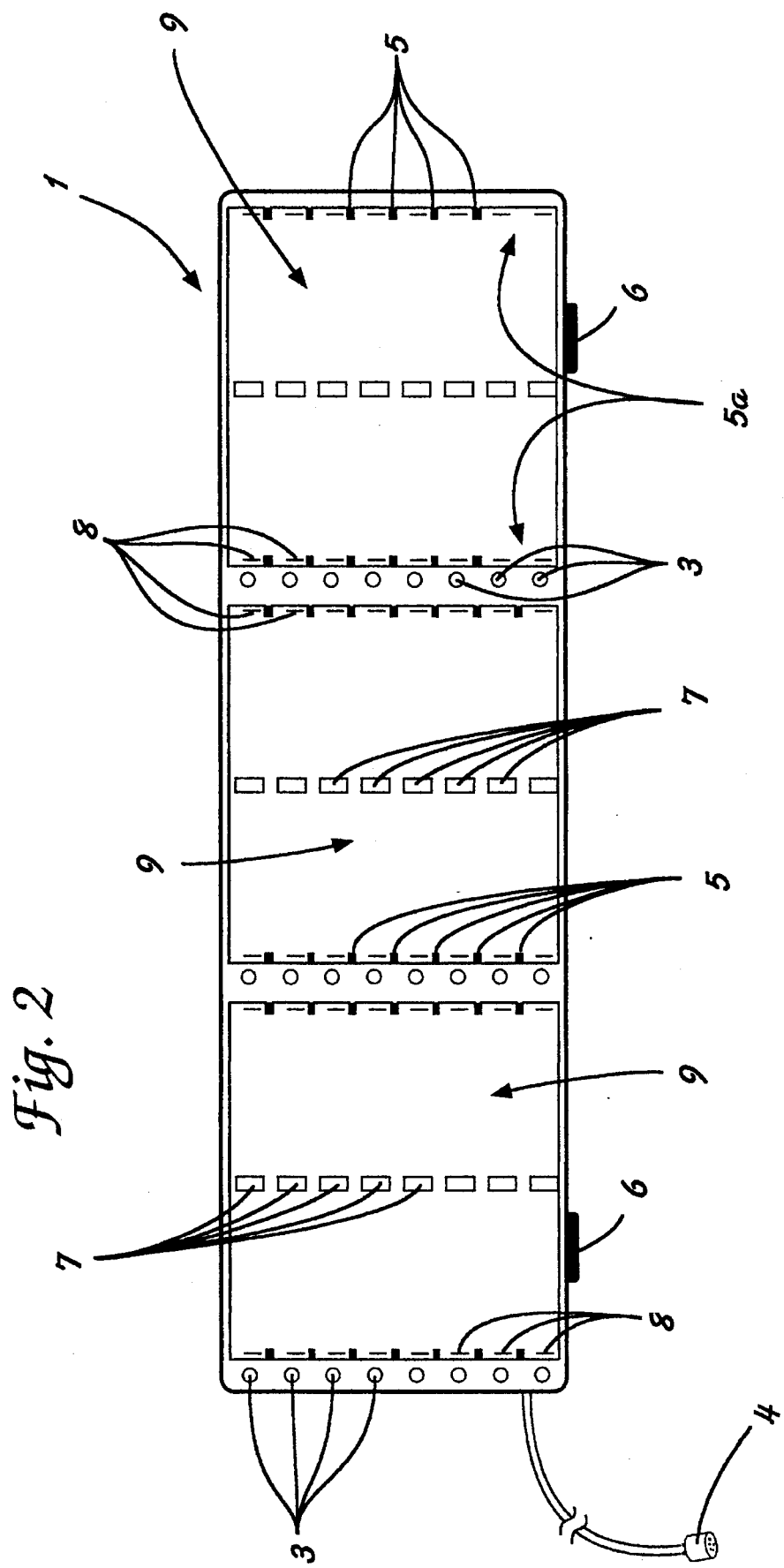

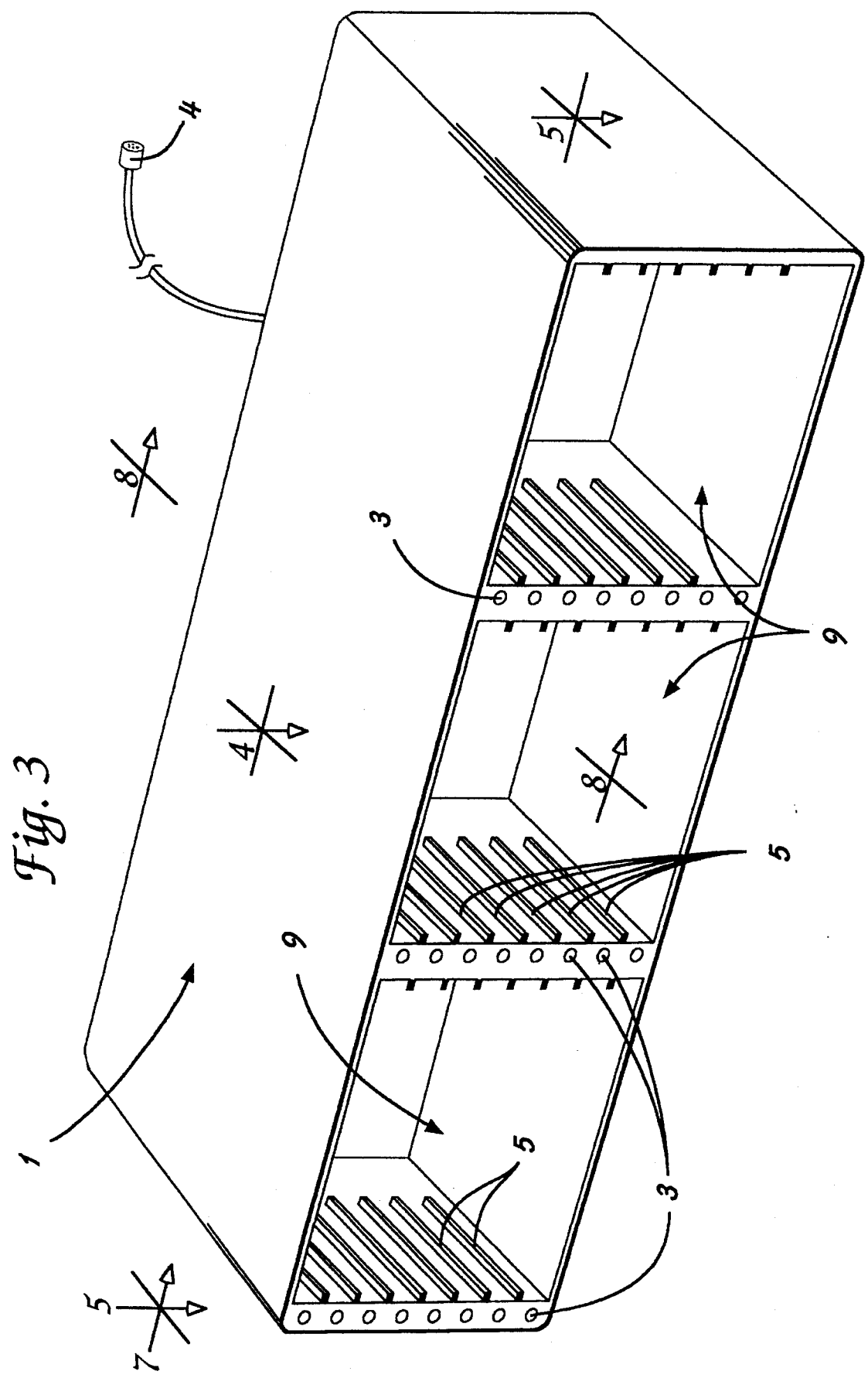

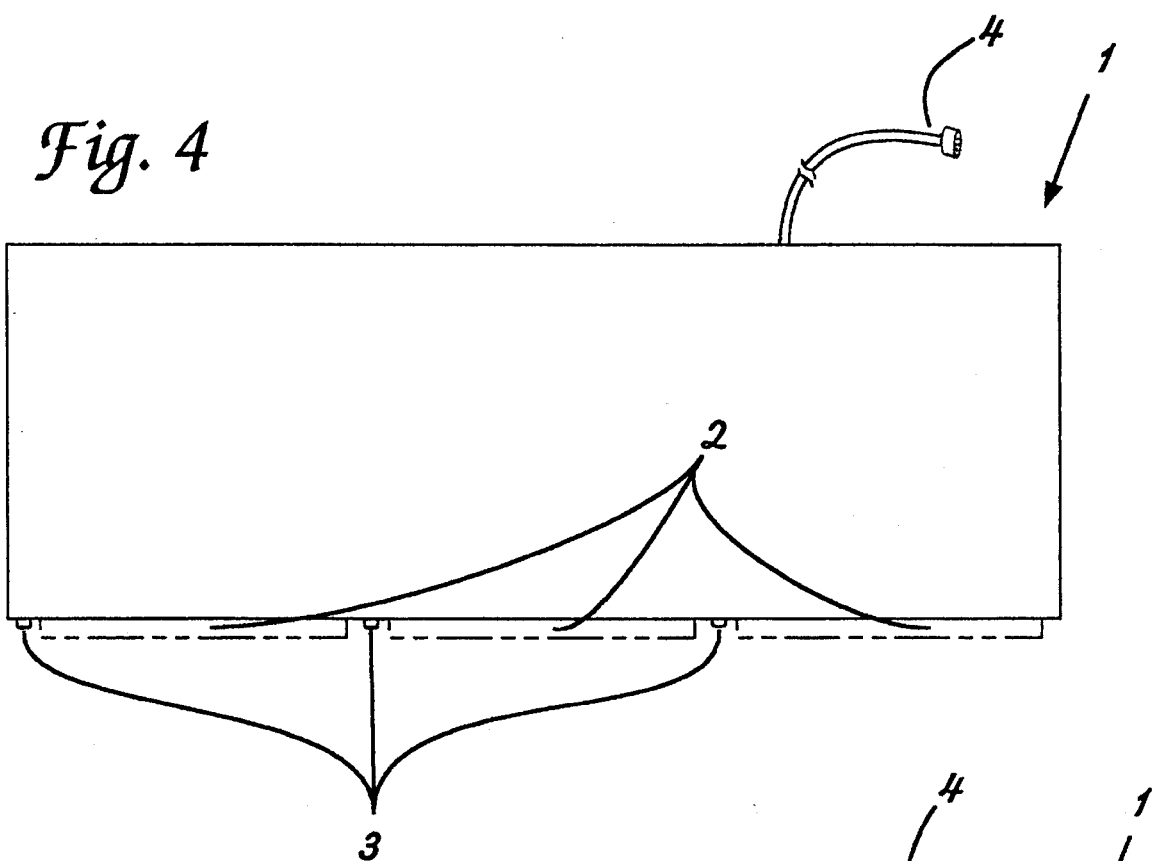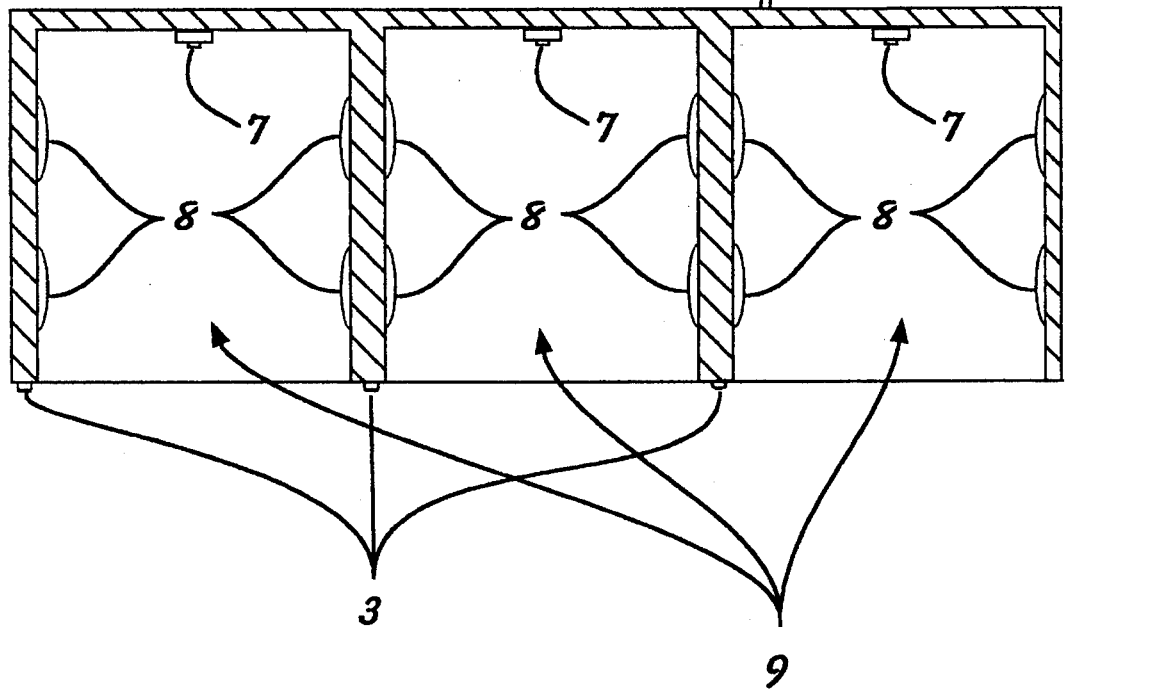

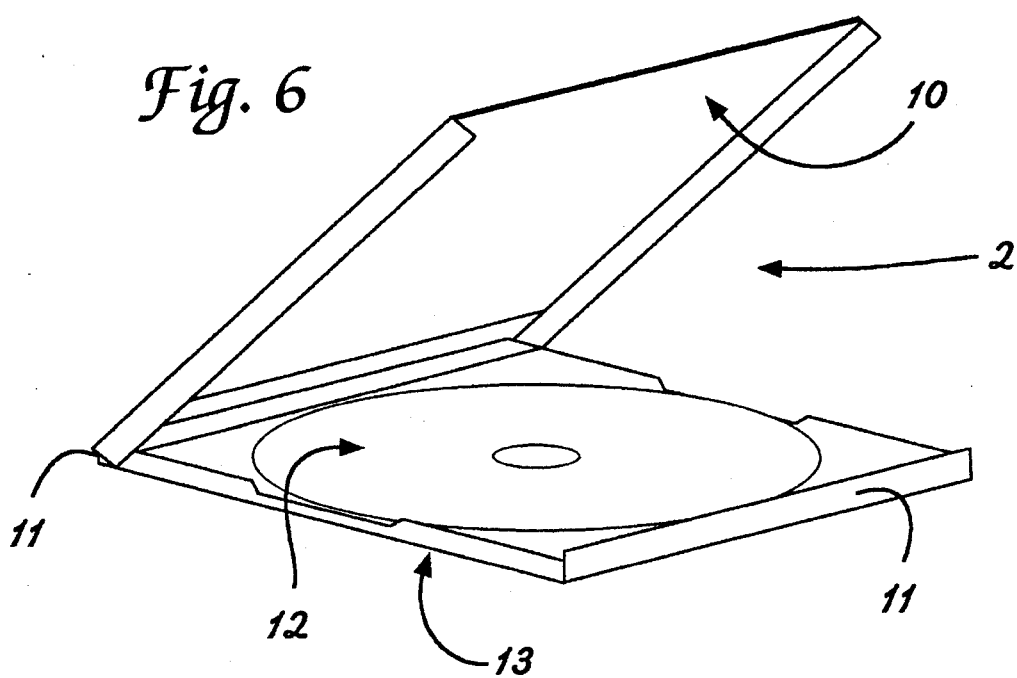
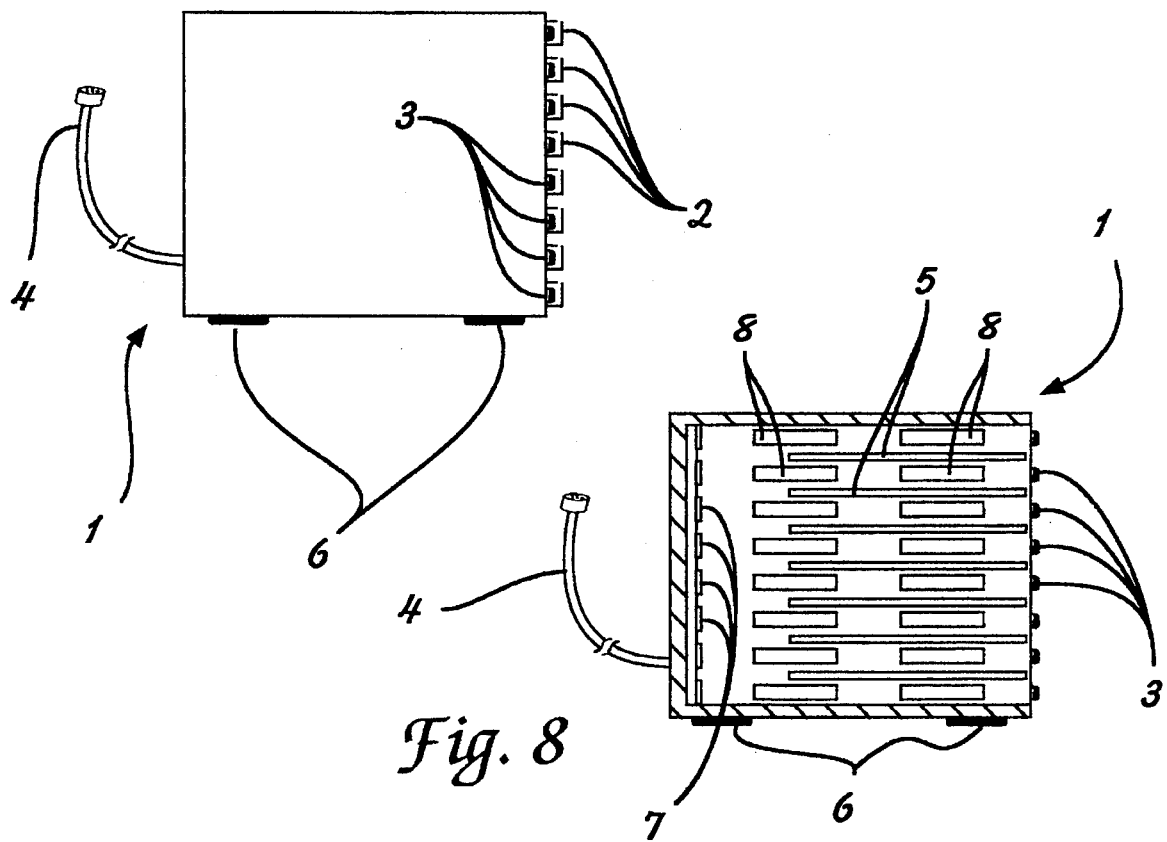

MULTIPLE-DISC PLAYER CONTROL AND DISPLAY DEVICE USING EMPTY DISC CASES

BACKGROUND

1. Field of the Invention

The disclosed invention relates to the control and display capabilities of a multi-disc player. Multi-disc players are CD(compact disc) players that have the ability to semi-permanently store and manipulate a number of discs. Discs are removed from their cases and stored in slots inside multi-player. Multi-player is able to robotically transfer a disc from storage to an internal player and play it. Multi-players are produced by a variety of manufacturers and in a variety of capacities.

Compact discs are purchased inside of an included clear plastic container of dimensions: 1 cm.×12.5 cm×14.2 cm(FIG. 6). This standard container, known as a 'jewel case,' is clearly labeled at the narrow ends with the artist, album title and production company. Pamphlets, called liner-notes, are provided with the disc and the disc-case. Liner-notes follow no rules of format besides folded dimensions and they can contain anything the artist designs, complete song lyrics or nothing but abstract artistic pictures. The liner-notes are held in the front of the disc-case and, through the clear plastic case, provide the front cover illustration. Through the back cover is seen a sequential list of the songs permanently enclosed inside of the plastic case.

Multi-player models vary but most use a system similar to the following: when a disc is loaded into the multi-player the user is prompted to enter title and group information through manipulation of a dial or buttons. Play groups can be used for arranging music into styles or artists. Multi-player unit remembers information in relation to slot positions.

Multi-disc player has a one-line alpha-numeric panel able to display one title at a time. Disc selection is made by scrolling through titles or by directly entering slot position number.

Slot position number is found by searching through a filing book. Filing book is a soft vinyl binder with clear plastic sheet pockets designed to hold liner-notes in an order corresponding to the discs positioned inside player.

2. Description of the Prior Art

Multi-player display is only able to show one title at a time. Making a selection is slow because user must scroll through the many titles in the multi-player one-by-one to find desired disc. Single title display is unable to display more than one selection in order to display entire play group.

Using the filing book to find a selection number can be difficult because the title and artist are not always clearly printed on the liner-notes. Selection is made by entering two digit slot position number into player.

The liner notes are unprotected while in the soft lining of the filing booklet and could be damaged by handling as opposed to in the hard plastic of the disc-cases.

The disc-case must be reunited with it's liner-notes when the disc package (disc, liner-notes, and disc-case) is removed or transported.

If disc-case is not stored nearby, song sequence information printed on the back becomes inaccessible.

SUMMARY

The disclosed invention is an empty disc-case storage device, disc selection device and disc indication device. The disclosed invention provides a simple system of making selections from discs stored inside of multiple-disc player. The disclosed invention displays status of discs stored inside of multiple-disc player. The invention is connected with an adapted multi-disc player by way of an interface cable, infra-red signal or other undefined system of digital communication. An adapted multi-player sends information to the disclosed invention about which discs are in active play group and which disc is playing. A version of the disclosed invention could apply to current non-adapted multi-players by imitating their infra-red remote control signals.

The disclosed invention holds empty disc-cases while their discs are inside of the multi-player(multiple-disc player). Numbered slots to hold the empty disc-cases in disclosed invention are associated with a slots inside of the multi-player. Empty disc-cases are stored in disclosed invention inside of slot of the same number as slot that associated disc is stored in inside of multi-player.

Slots where empty disc-cases are stored in the disclosed invention are open-faced. The artist and album title printed on the narrow edge of the empty disc-case are visible. The ends of the disc-cases serve as labels for buttons adjacent to each disc-case. Single press action on button selects the related disc in the multi-player. Exposed title on empty disc-case, stored in the disclosed invention, serves as a label for a button that selects the disc stored inside of the multi-player.

In addition to buttons, disclosed invention uses receivers inside of the disc-case slot to facilitate pressing directly onto the exposed face of the disc-case to make disc-selection. Pressing on the exposed face of the empty disc-case slides the disc-case back into a receiver at the back of the disc-case slot. Receiver sends same signal as button to select disc in multi-player.

Disclosed invention displays information received from multi-player by highlighting related empty disc-case. The disclosed invention is able to display one, two, or all selections because each disc-case is able to indicate itself. This enables the disclosed invention to display an entire play group at once.

Disc in multi-player can be inactive, active(playing), or in active play group. Buttons that are used to select discs are also the translucent lights that indicate disc status. An illuminated light would indicate the selection was one of an active play group and a blinking light would indicate the playing selection. An option to blinking are lights designed to change color to differentiate status. An option to translucent buttons are disc-cases lit from inside slots to 'glow' when indicated. 'Glow' appears from light carried through clear plastic of the disc-case through to exposed face.

Disclosed invention is an improvement over the current system because it keeps the entire disc-case together with the liner notes. It provides quick access to song sequence information, protected storage for liner-notes, and easy retrieval of the disc-case for transport use.

The disclosed invention can take the form of any size or shape, for example, a one column, tower style unit, could be built to hold any number of cases, and a unit could be designed to hang on a wall mount.

BRIEF DESCRIPTION OF THE DRAWINGS

FIG. 1 is a front view of one embodiment of the disclosed invention in the form of a twenty-four slot type showing the placement of the disc-cases inside of unit.

FIG. 2 is a front view of a twenty-four slot type embodiment without any disc-cases showing the containment springs and receivers inside of the cavities.

FIG. 3 is a perspective of an empty twenty-four slot type embodiment.

FIG. 4 is a top view of a loaded twenty-four slot type embodiment showing the placement of the disc-cases inside of unit.

FIG. 5 is a top to bottom horizontal sectional of empty twenty-four slot type embodiment showing the containment springs and the receivers.

FIG. 6 is a disc-case with disc.

FIG. 7 is a left side of a loaded twenty-four slot type embodiment showing the placement of the disc-cases inside of unit.

FIG. 8 is a left, to right vertical sectional of an empty twenty-four slot type embodiment showing the containment springs and the receivers.

DETAILED DESCRIPTION OF THE PREFERRED EMBODIMENT

Figure 9:
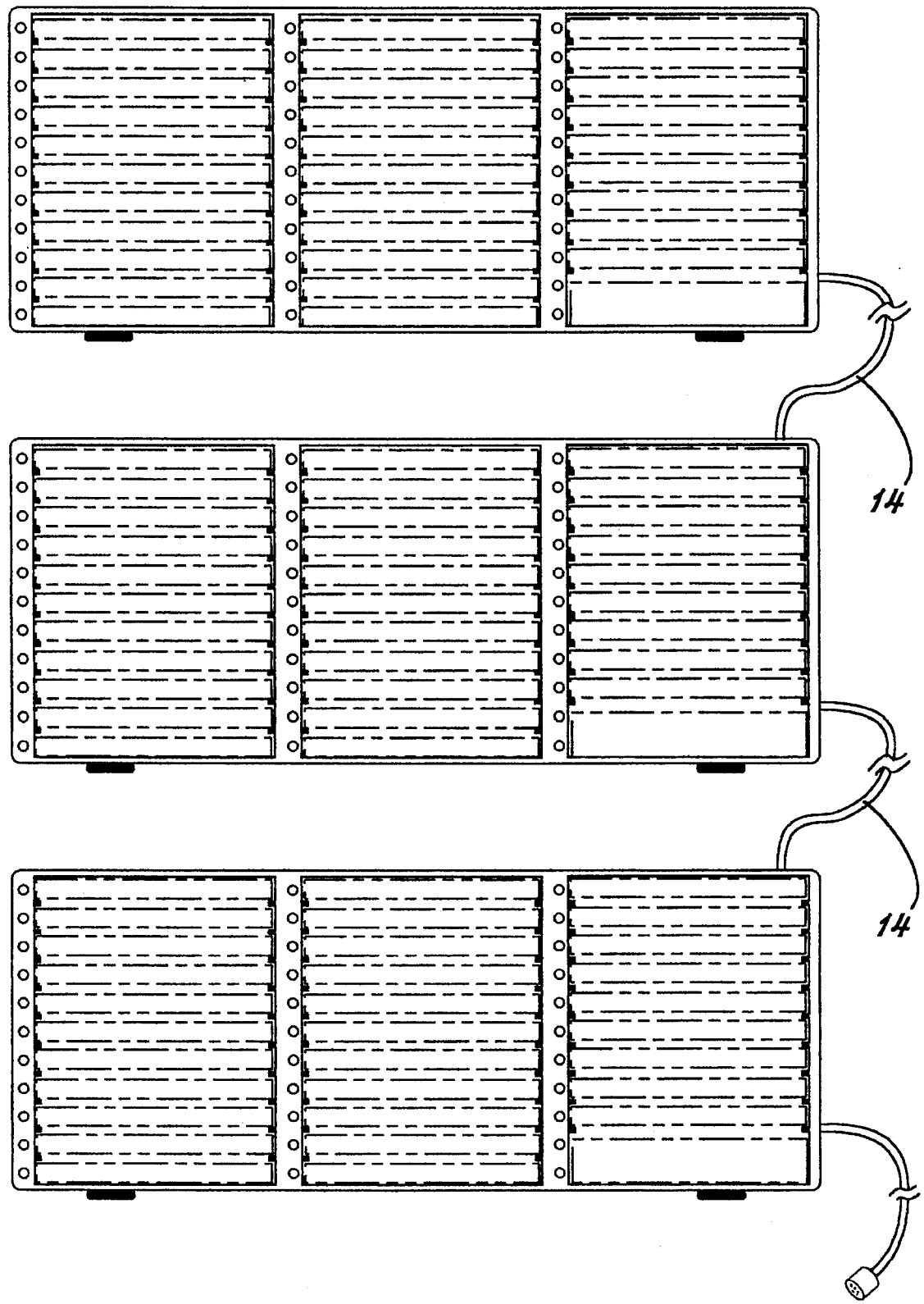
FIG. 9 is a loaded ninety-nine slot type embodiment showing the placement of the disc-cases inside of unit.

Shown in FIG. 1–5, 7, and 8 is an example of a twenty-four slot type embodiment of the disclosed invention 1. Disclosed invention 1 is connected to an adapted multiple-disc player (not shown) by way of an interface cable 4. This embodiment of the disclosed invention 1 takes the form of a casing supported on pads 6 with three internal cavities 9. The internal cavities 9 have a series of ribs on the side walls 5 which provide eight storage positions per cavity. Disc-case 2, shown by dashed lines, sits in the disclosed invention in twenty-four numbered slot positions. One cavity position is provided with removable ribs 5A, when removed, as shown, slot accommodates a double album disc-case 2A.

Disc-case 2, shown open in FIG. 6, is made of clear plastic material and of standard dimensions. The artist and title of the included disc 12 is printed at the narrow ends 11 of the disc-case 2. At the front cover 10 of the disc-case 2 is the holder for liner-notes. On the bottom 13 of the disc-case 2 is an enclosed printing of the song order.

With disc in multi-player, empty disc-case 2 fits into the disclosed invention 1 with narrow side 11 exposed. Each slot, supported by rib 5, has a numbered button/indicator 3 adjacent to it and a receiver 7 at the back of it. Each stored disc-case 2 is in proximity to a numbered button/indicator 3 in such a way so that each button/indicator 3 clearly represents a disc-case 2. Empty disc-case 2 slot number in disclosed invention I matches slot number of disc stored inside connected multi-player. Springs 8 hold the disc-case 2 from creeping away from contact with receiver 7. Springs 8 are not strong enough to prohibit removing and replacing empty disc-case by hand.

Positioned at the back of cavities 9 are receivers 7, one in contact with the back of each of the disc-cases 2 stored inside of unit 1. When the exposed face 11 of a stored disc-case 2 is pressed upon by user, it activates the associated receiver 7. When activated, buttons/indicators 3 and receivers 7, send selection signal to multi-player through cable 4.

Translucent button/indicator 3 serves both the functions of sending the same signal as receiver 7 when pressed, and illuminating to indicate activity status. The button/indicator 3 blinks when disc associated with slot position in multi-disc player is active(playing). All button/indicators 3 illuminate that are representing slots of discs included in active play-group.

Other embodiments of the invention could be of different ratio of rows to columns or of different size than the shown twenty-four, three column, unit 1. A ninety-nine slot embodiment of the invention is shown in FIG. 9 as a three piece unit connected by transfer cables 14.

I claim:

1. A storage, selection and indication device for operation in conjunction with a multiple-disc disc player, said multiple-disc player being capable of electro-mechanically accessing any of a plurality of discs, comprising:

(a) a housing having a plurality of disc case storage locations for storage of a plurality of disc cases of said plurality of discs accessible by said multiple-disc player, each of said disc case storage locations having a physical dimension enabling a disc case of said disc cases to be inserted and held in said location so that a labeled face of said disc case remains exposed so as to provide a means to identify the subject of the disc that said disc case is designated to contain, each said disc case storage location in said housing being paired with one of said plurality of discs accessible by said multiple-disc player;

(b) a connecting system that adjoins said housing to said multiple-disc player enabling the transfer of electronic information from said multiple-disc player to said disc case storage locations and/or from said disc case storage locations to said multiple-disc player;

(c) a selection system having a means of making selections from said plurality of discs and informing said multiple-disc player of said selections, said selection system comprising a plurality of buttons, each button being paired with one of said disc case storage locations, each button when pressed selecting the disc paired with the disc case storage location paired with the button, said selection system communicating with said multiple-disc player through said connecting system; and (d) an indication system being capable of electronically highlighting a specific disc case storage location or a plurality of specific disc case storage locations simultaneously, said indication system communicating with said multiple-disc player through said connecting system.

2. The device in accordance with claim 1 wherein each button of said selection system is positioned on the face of said housing adjacent to the exposed labeled face of a disc case, said position resulting in said pairing of the button with the disc case storage location.

3. The device in accordance with claim 1 wherein each button of said selection system includes a means for pressing the button by pressing onto the exposed labeled face of a stored disc case, each button being located at the posterior of a disc case storage location pairing the button with the disc case storage location, said button being positioned in contact with the inside face of the stored disc case, the inside face being opposite said exposed labeled face.

4. The device in accordance with claim 1 wherein the buttons of said selection system illuminate for highlighting the disc case storage locations for said indication system.

5. The device in accordance with claim 1 wherein each disc case storage location has a light or lights positioned inside of the disc case storage location to enable said indication system to highlight each disc case storage location, each disc case storage location having the light or lights being able to illuminate the inside of the disc case storage location and the back and/or sides of the disc case stored in the disc case storage location so as to enable the glow from the light or lights to pass through a translucent material of the disc case to the exposed face of the disc case.

6. The device in accordance with claim 1 wherein said indication system can vary its indication method to enable it to indicate alternate information about each disc, said indication system having a means of varying its indication between non-indicated discs, indicated discs and alternately indicated discs.

7. The device in accordance with claim 1 wherein a rib separating two adjacent disc case storage locations can be remove, the removal of the separating rib allows the two disc case storage locations to store a double sized disc case.

8. The device in accordance with claim 1 wherein the connecting system comprises of a cable interface adjoining said device to said multiple-disc player.

9. The device in accordance with claim 1 wherein the connecting system comprises an infra-red beam transmitter and receiver system adjoining said device to said multiple-disc player.

10. The device in accordance with claim 1 wherein u-shaped springs line the sides of the disc case storage locations, thereby providing a more secure fit for the disc cases.

11. The device in accordance with claim 1 wherein said housing comprises any ratio of columns to rows and wherein said housing comprises a single unit or multiple units connected by an electronic connecting system.

12. A storage and selection device for operation in conjunction with a multiple-disc disc player, said multiple-disc player being capable of electro-mechanically accessing any of a plurality of discs, comprising:

(a) a housing having a plurality of disc case storage locations for storage of a plurality of disc cases of said plurality of discs accessible by said multiple-disc player, each of said disc case storage locations having a physical dimension enabling a disc case of said disc cases to be inserted and held in said location so that a labeled face of said disc case remains exposed so as to provide a means to identify the subject of the disc that said disc case is designated to contain, each said disc case storage location in said housing being paired with one of said plurality of discs accessible by said multiple-disc player;

(b) a connecting system that adjoins said housing to said multiple-disc player enabling the transfer of electronic information from said multiple-disc player to said disc case storage locations and/or from said disc case storage locations to said multiple-disc player;

(c) a selection system having a means of making selections from said plurality of discs and informing said multiple-disc player of said selections, said selection system comprising a plurality of buttons, each button being paired with one of said disc case storage locations, each button when pressed selecting the disc paired with the disc case storage location paired with the button, said selection system communicating with said multiple-disc player through said connecting system.

\* \* \* \* \*